United States Patent [19]

Hornbeck

[11] Patent Number: 4,465,449

[45] Date of Patent: Aug. 14, 1984

[54] COEXTRUSION FEEDBLOCK FOR MAKING LIGHTWEIGHT, RIGID THERMOPLASTIC PIPE

[75] Inventor: Robert L. Hornbeck, Mineral Wells, W. Va.

[73] Assignee: Borg-Warner Chemicals, Inc., Parkersburg, W. Va.

[21] Appl. No.: 447,352

[22] Filed: Dec. 6, 1982

[51] Int. Cl.³ .............................................. B29F 3/04
[52] U.S. Cl. .................. 425/131.1; 264/45.9; 264/173; 264/209.8; 425/133.1; 425/462
[58] Field of Search ................. 425/131.1, 133.1, 462, 425/466, 467, 192 R; 264/173, 45.9, 46.1, 209.8

[56] References Cited

U.S. PATENT DOCUMENTS

| 2,574,555 | 11/1951 | Galloway | 425/192 R |
|---|---|---|---|
| 3,545,043 | 12/1970 | Schwindy | 425/192 R |
| 3,546,743 | 12/1970 | Roth | 425/133.1 |
| 3,780,154 | 12/1973 | Müller et al. | 425/133.1 |
| 3,856,448 | 12/1974 | Iijima et al. | 425/133.1 |
| 3,966,377 | 6/1976 | Upmeier et al. | 425/72 |
| 4,042,661 | 8/1977 | Cook | 264/173 |
| 4,125,585 | 11/1978 | Rosenbaum | 425/133.1 |
| 4,249,875 | 2/1981 | Hart et al. | 425/133.1 |
| 4,280,801 | 7/1981 | Wheeler, Jr. et al. | 425/113 |
| 4,281,981 | 8/1981 | Feldman | 425/467 |
| 4,298,325 | 11/1981 | Cole | 425/133.1 |
| 4,364,882 | 12/1982 | Doucet | 425/462 |
| 4,377,545 | 3/1983 | Hornbeck | 264/173 |

FOREIGN PATENT DOCUMENTS 2821333 11/1978 Fed. Rep. of Germany ..... 264/45.9

Primary Examiner—Jeffery R. Thurlow
Attorney, Agent, or Firm—Richard J. Schlott

[57] ABSTRACT

Coextrusion feedblock apparatus for making multilayer, lightweight pipe wherein means are provided to convert thermoplastic material into pipe or tubing having a plurality of layers. Means are provided for adjusting the feedblock apparatus to assure thickness uniformity of the inner layer of the pipe or tubing and further, means are provided for adjusting overall wall thickness of the multilayer pipe or tubing.

4 Claims, 2 Drawing Figures

COEXTRUSION FEEDBLOCK FOR MAKING LIGHTWEIGHT, RIGID THERMOPLASTIC PIPE

BACKGROUND OF THE INVENTION

The present invention relates to a coextrusion feedblock for making lightweight, rigid thermoplastic pipe and tubing and more particularly to a coextrusion feedblock having adjusting means for controlling wall thickness and uniformity in the extrusion of thermoplastic pipe and tubing.

Thermoplastic pipe made of solid plastics such as polyvinyl chloride (PVC) and graft acrylonitrile-butadiene-styrene (ABS) is sold in huge quantities for use in water supply, sanitary and storm pipes, as well as many other applications. One great advantage of the thermoplastic pipe is that it is lighter in weight than the pipe it usually replaces or displaces; another advantage is its ease of fabrication into fluid systems. Its structural integrity is good for many applications, but improvement is desired in other applications.

For many applications a desirable pipe is a smooth surfaced, fluid impervious pipe of a thickness to give it good structural integrity but light enough to have the lightweight and ease of fabrication advantages of plastic pipe. A simple, inexpensive and novel apparatus for making such a pipe is the subject matter of this invention.

The pipe made in accordance with the apparatus of the present invention is formed by extruding multiple layers of the thermoplastic. The extruded outer and inner layers are made of solid plastic and comprise the exterior and interior of the pipe, and the extruded center layer is made of a foamable plastic, preferably the same as the outer and inner layers.

The thermoplastic utilized in making the pipe may be ABS, PVC, phenylene oxide polymer, polycarbonate, polyethylene, polypropylene, polystyrene, polybutylene or combinations thereof. The center layer of foamable thermoplastic contains a chemical foaming or blowing agent which is incorporated into the plastic prior to charging the plastic to the extruder. Suitable foaming agents are bicarbonate of soda and citric acid, azodicarbonamide and the N-nitroso compounds. Modern Plastics Encyclopedia, 1975-1976, at pages 127-129, discloses other chemical foaming agents which can be utilized in making foamed thermoplastic materials.

The apparatus employed for carrying out the method of the present invention comprises a plurality of extruders, preferably two, connected to a single extrusion die having multiple passages for receiving and forming the plastic discharged by the extruders. More specifically, the novel aspect of the apparatus of this invention is adjusting means in the single die for controlling the thickness uniformity of the inner layer of the pipe.

BRIEF DESCRIPTION OF THE DRAWINGS

A better understanding of the novel apparatus of the present invention can be gleaned from the drawings wherein.

Figure 1:
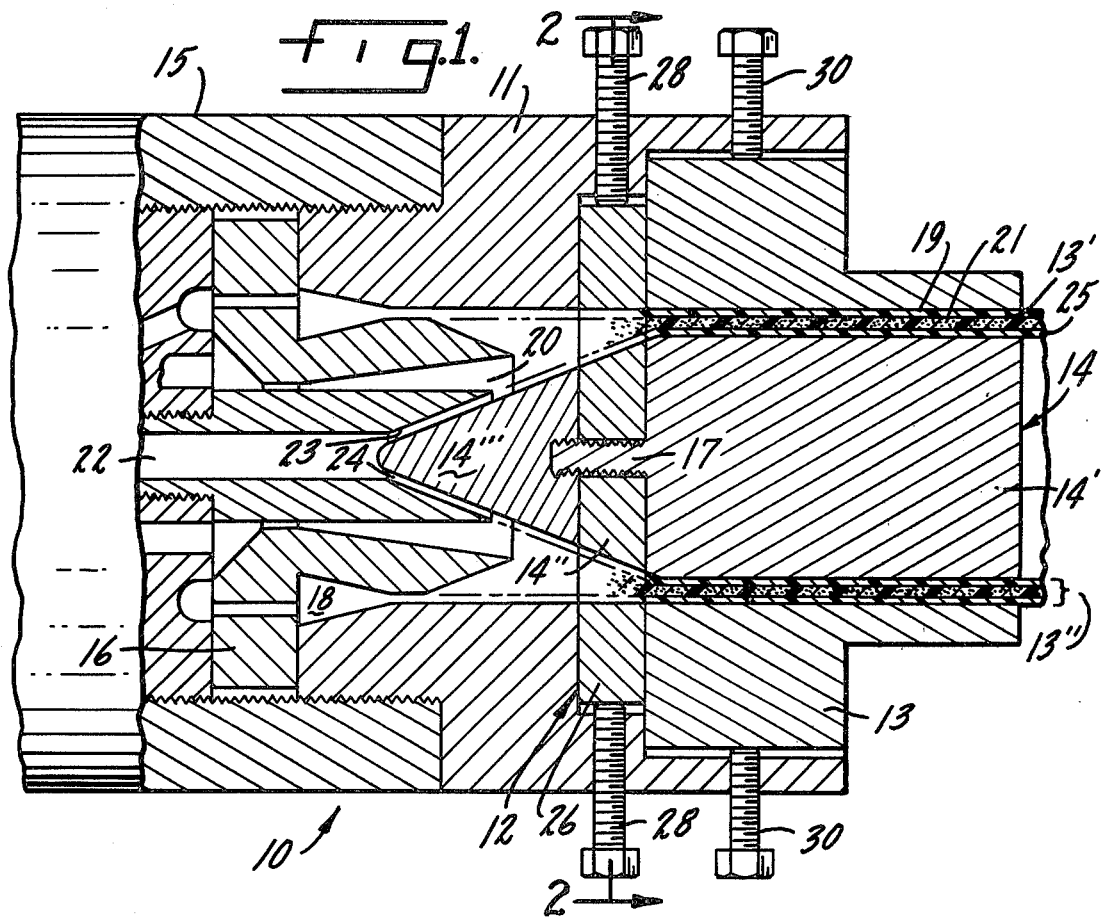
FIG. 1 is a sectional view, partially broken away, of the extrusion die.

Disclosed in FIG. 1 is the extrusion die of the present invention and designated generally by the reference numeral 10. The die 10 includes an adapter plate 11, a spider plate 12, a bushing 13 having a central, longitudinal bore 13' therethrough and a cylindrical torpedo 14 disposed within the bore 13'. As shown, torpedo 14 comprises a pin 14', central section 14" and tapered end or core 14''', all fastened together by stud means 17. The inner diameter of the bushing 13 is spaced from the outer diameter of cylindrical torpedo 14 to provide a passageway 13". The die 10 is attached to a feedblock 15. The feedblock 15 is shown broken away and is of the type disclosed in U.S. Pat. No. 4,125,585 as a plurality of plates. As in the aforementioned patent, the die 10 of the present invention receives melted thermoplastic material from two extruders. The thermoplastic material for inner and outer layers 25 and 19 respectively of the pipe or tubing is fed to the feedblock 15 from one extruder (not shown) and center layer 21 of the pipe is fed from a second extruder (not shown).

The feedblock 15 includes a core 16 which cooperates with a passageway 18 to provide a passage for and form the outer layer 19 of the pipe or tubing. A passageway 20 is provided for passage of the thermoplastic material to form the center layer 21 of the pipe. The feedblock 15 contains a cylindrical bore 22 which has a diverging taper 23 on its inner diameter adjacent the end thereof. The bore 22 receives a tapered end 14''' of the torpedo 14 and is spaced therefrom to form a passageway 24. The thermoplastic material for the inner layer 25 of the pipe is delivered through bore 22 and passageway 24 to the die 10.

Figure 2:
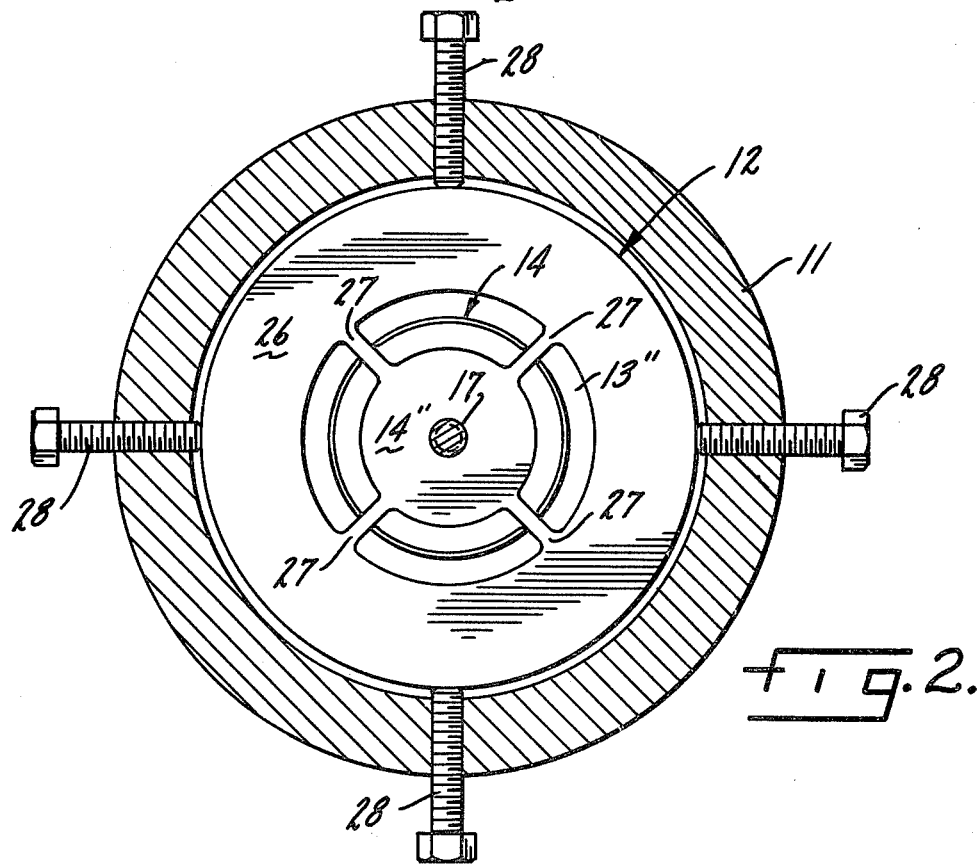
FIG. 2 is a cross-sectional view taken on the line 2—2 of FIG. 1.

As will be seen more clearly by turning to FIG. 2, the spider plate 12 comprises a spider body 26 and a plurality of legs 27. A plurality of evenly spaced bolts 28 are threaded through the adapter plate 11 and are in engagement with the spider body 26. Threading of the bolts 28, in or out, provides radial movement to the spider body 26 and legs 27 and thus radial movement of the torpedo 14 to which the legs 27 are in engagement. The radial movement of the torpedo 14 by the spider body 26 and legs 27 changes the passageway 24 between the tapered end 23 of the bore 22 and the tapered end 14' of the torpedo 14. Thus, uniformity of the inner layer 25 of the pipe can be obtained by adjusting passageway 24 by threading the bolts 28 in and out.

The bushing 13 is also radially adjustable with respect to the cylindrical torpedo 14 means of evenly spaced threaded bolts 30. Threading the bolts 30 in and out adjusts the passageway 13" between the torpedo 14 and bushing 13.

In operation, thermoplastic material which has been heated to its melt temperature in an extruder (not shown) enters the feedblock 15. A portion of the thermoplastic material passes through passageway 18 to form the outer layer 19 of a pipe. At the same time, another portion of the same thermoplastic material flows through bore 22 and clearance 24 to form the inner layer 25 of the pipe.

Simultaneously, a foamable thermoplastic material is discharged from an extruder (not shown) into the passageway 20 of the feedblock 15 to form the center layer 21 of the pipe.

During operation of the present apparatus, it is possible to adjust the wall thickness of the multilayered pipe by threading the bolts 30 in and out to adjust the passageway 13". The passageway 13" may be thus increased or decreased at any point around the circumference of the extrudate to provide uniform wall thickness of the finished pipe.

In addition, and more important, the apparatus of the present invention provides means for controlling the thickness uniformity of the inner layer 25 of the pipe. In order to control this thickness uniformity, the bolts 28 are threaded in and out whereby the spider plate 12 moves the cylindrical torpedo 14 to relocate the tapered end 14''' within the tapered end 23 of bore 22, and thus radially adjust the passageway 24 and thereby the thickness uniformity of the layer 25. The thickness uniformity of the finished pipe is maintained by adjustment of passageway 13'' as described, compensating for the radial movement of the cylindrical torpedo 14.

While this invention has been described with certain details thereof, these details are not to be considered as limitations on the spirit or scope of the invention except insofar as these may be incorporated in the appended claims.

I claim:

1. A coextrusion feedblock apparatus for making multilayer thermoplastic pipe and tubing comprising a feedblock adapted to receive melted thermoplastic material from extruder means and feed such thermoplastic material to a coextrusion die, said die including a bushing member having a central, longitudinal bore therethrough, a cylindrical torpedo member disposed in said longitudinal bore and spaced therefrom to provide a first passageway for receiving the thermoplastic material from said feedblock, said feedblock including a cylindrical bore having a diverging taper adjacent an end thereof, said cylindrical torpedo being tapered at one end thereof, said tapered end of said torpedo resting within but spaced from the diverging tapered portion of said cylindrical bore to provide a second passageway, and means for moving the tapered end of said cylindrical torpedo radially with respect to said diverging tapered portion to adjust said second passageway.

2. A coextrusion feedblock apparatus in accordance with claim 1 wherein said means for moving the tapered end of said cylindrical torpedo comprises spider means in contact with said tapered end.

3. A coextrusion feedblock apparatus for making multilayer pipe and tubing comprising a feedblock adapted to receive melted thermoplastic material from extruder means and feed such thermoplastic material to a coextrusion die, said die including a bushing member having a central, longitudinal bore therethrough, a cylindrical torpedo member disposed in said longitudinal bore and spaced therefrom to provide a first passageway for receiving the thermoplastic material from said feedblock, said feedblock including a cylindrical bore having a diverging taper adjacent and end thereof, said cylindrical torpedo being tapered at one end thereof, said tapered end of said torpedo nesting within but spaced from the diverging tapered portion of said cylindrical bore to provide a second passageway, means for moving said bushing radially with respect to said torpedo member to adjust said first passageway, and means for moving the tapered end of said cylindrical torpedo radially with respect to said diverging tapered portion to adjust said second passageway.

4. A coextrusion feedblock apparatus in accordance with claim 3 wherein said means for moving the tapered end of said cylindrical torpedo comprise spider means in contact with said tapered end.

* * * * *